United States Patent [19]
Stringfellow et al.

[11] Patent Number: 5,663,616
[45] Date of Patent: Sep. 2, 1997

[54] NOISE TOLERANT BRUSHLESS MOTOR POSITION MONITORING APPARATUS AND METHOD

[75] Inventors: David Wayne Stringfellow, Kokomo, Ind.; Abhijeet V. Chavan, Ann Arbor, Mich.

[73] Assignee: Delco Electronics Corporation

[21] Appl. No.: 516,247

[22] Filed: Aug. 17, 1995

[51] Int. Cl.$^6$ ............................................. H02K 23/00
[52] U.S. Cl. .......................... 318/254; 318/138; 318/439; 318/567; 318/569; 318/600
[58] Field of Search .............................. 318/254, 138, 318/439, 567, 569, 600, 739, 798–815

[56] References Cited

U.S. PATENT DOCUMENTS

| | | | |
|---|---|---|---|
| 4,113,385 | 9/1978 | Ford et al. | 318/798 X |
| 4,962,339 | 10/1990 | Schauder | 318/798 |

*Primary Examiner*—Karen Masih
*Attorney, Agent, or Firm*—Jimmy L. Funke

[57] ABSTRACT

A noise tolerant motor position monitoring circuit having a digital filter section receives and filters noisy hall effect sensor inputs for use in determining rotational motor position. The motor position monitoring circuit exchanges information and instructions with a microprocessor which utilizes the motor position information to calculate motor distance traveled, motor speed, etc. The hall effect sensor signals are noisy due to the particular environment in which the sensed motor is placed, such as in industrial process and automotive applications. Each monitored segment of rotation corresponds to the motor rotational switching sequence of a motor driver circuit, a digital counter generates a running total rotational count and increments or decrements the total count depending upon the direction of motor rotation. A programmable digital filter time constant is generated and, via state machine operation, a hall sensor signal duration range is implemented for differentiating valid motor rotation signals from spurious noise signals. The desired operating range is programmably altered via the microprocessor and programmable digital filter time constant to allow the motor position monitoring circuit to operate for a broad range of motors having divergent characteristics.

18 Claims, 7 Drawing Sheets

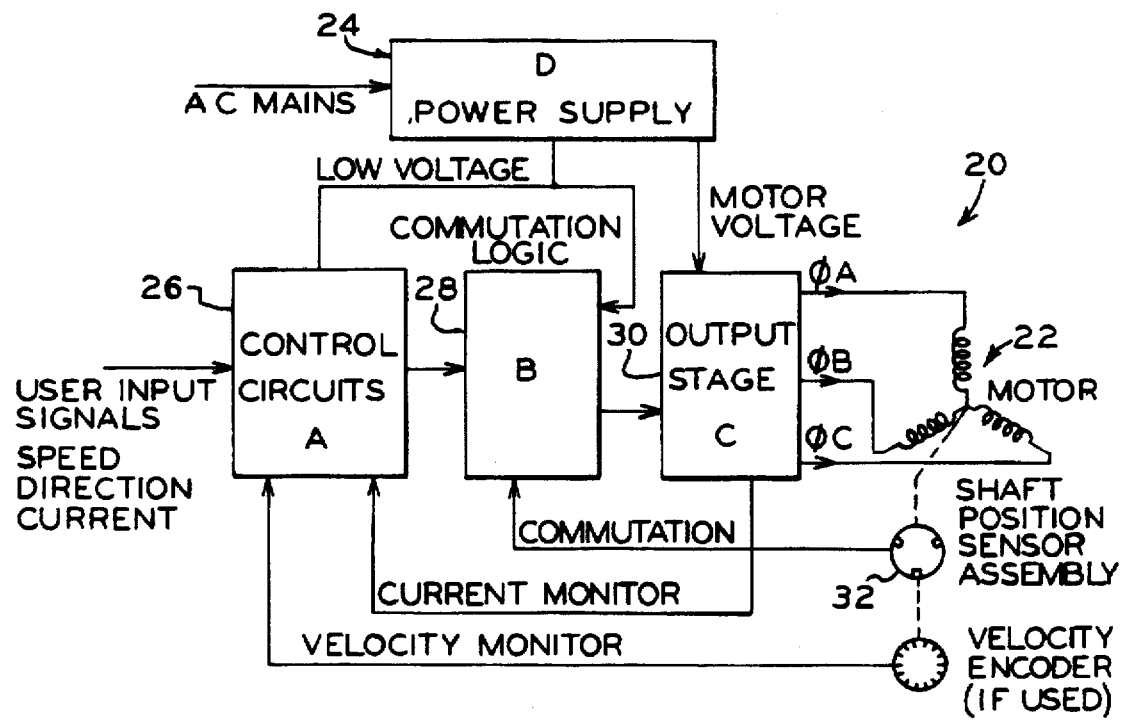
FIG_1 PRIOR ART
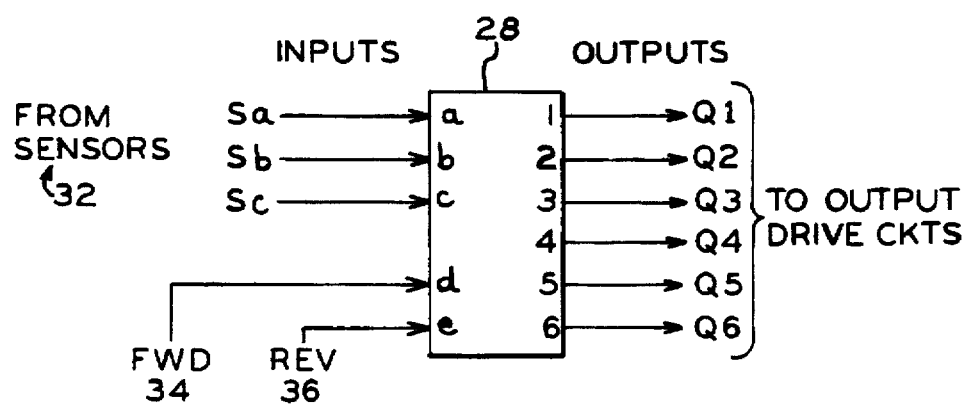
FIG_2 PRIOR ART

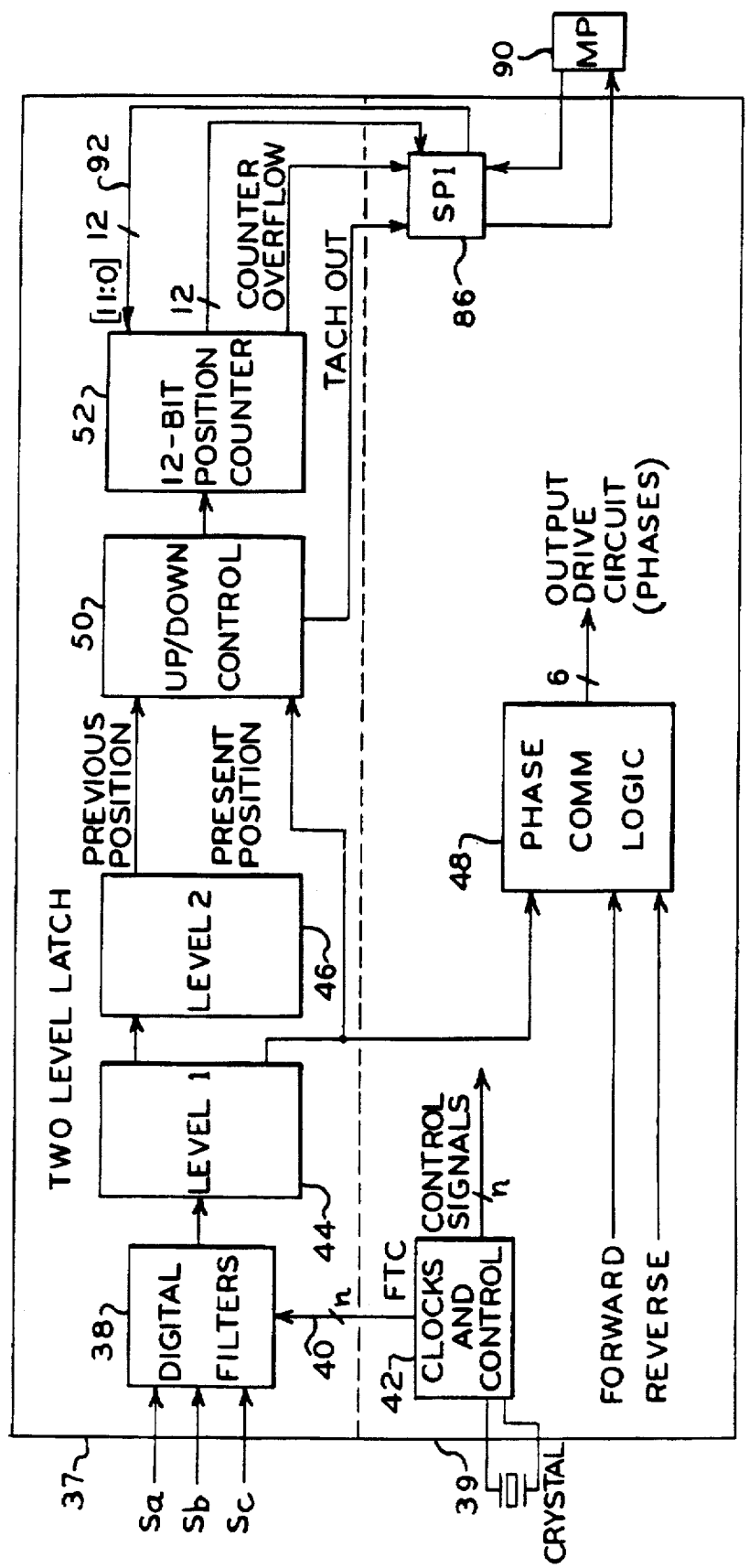
FIG_3

FIG_5

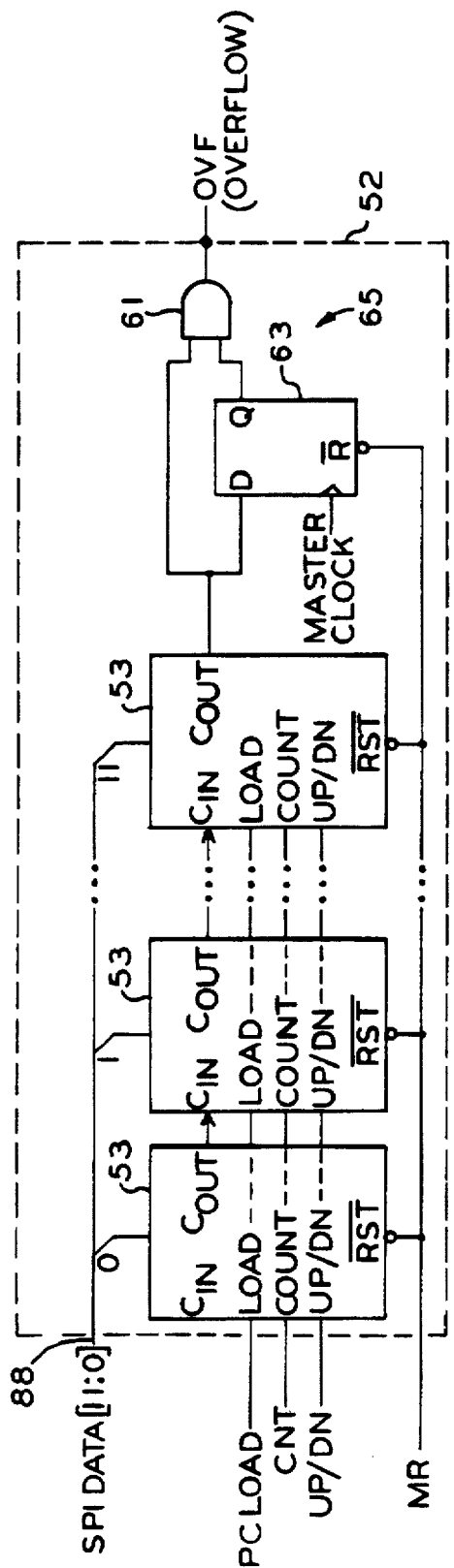
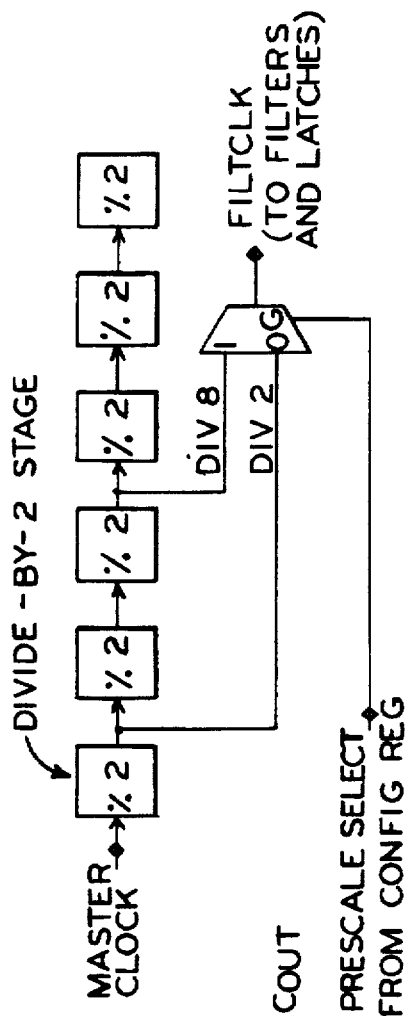
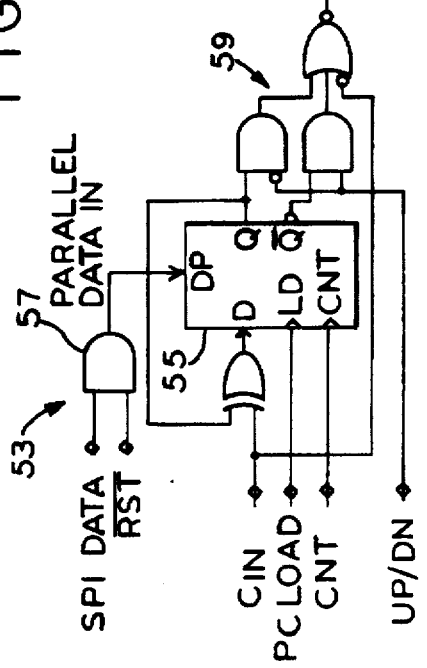

NOISE TOLERANT BRUSHLESS MOTOR POSITION MONITORING APPARATUS AND METHOD

BACKGROUND OF THE INVENTION

The circuit of the present invention relates generally to motor control circuits and more particularly to brushless motor position monitoring circuits incorporated therein. It is known to attach hall effect sensors to motor windings for sending digital signals indicating motor position to an IC commutation logic circuit. The commutation logic generates a select pulse sequence at the output phase winding drive signals so as to cause the motor to rotate in a desired manner. Prior art circuits utilized external components outside of the IC, typically resistor, capacitor and/or inductor types of low pass filters, to suppress noise spikes. Such low pass filters were generally custom fit according to the particular motor application. Accordingly, for each different application a different set of RC components was required for proper effective filter operation.

Prior to the present invention, previous commutation logic circuits did not utilize digital filtering. As mentioned above, external components were utilized for noise filtration. There were no provisions for recording or observing distance traveled by the motor (total number of motor rotations) and the control circuits were very sensitive to signal transients on the hall effect sensor inputs.

What is needed is a motor position monitoring apparatus for use in motor control circuits for monitoring the position of a motor and for providing information relating to the total distance traveled by the motor.

A motor position monitoring apparatus is also needed that is noise tolerant and that can filter very noisy inputs from hall effect position sensors. Given proper filtering, the position monitoring apparatus can operate in noisy environments such as in industrial control applications and automotive applications such as when placed in the vicinity of spark plug wires or other vehicle electronics.

SUMMARY OF THE INVENTION

The brushless motor position monitoring circuit of the present invention is directed at providing a digital filter section incorporated in an IC for filtering noisy hall effect sensor inputs. The digital filter provides a filtered motor position signal for use in the position monitoring circuit, thereby allowing the circuit to be utilized in noisy automotive and industrial environments. In addition, the motor position monitoring circuit monitors the rotation of the motor and records the distance traveled by the motor (the total number of motor rotations) which is input to a host microprocessor. In accordance with the present invention, a programmable digital filter may be programmed via the host CPU to provide a variable time constant and variable filtering range. In this manner, the internal detecting pulse, which filters out noise and determines if a valid pulse should be recognized, can be configured to operate over a wide range of motor applications. Depending upon the required sensitivity, a requisite number of bits may be allocated to effectuate the desired degree of programmability.

The filtered motor position inputs are received by a level 1 latch which effectively takes a snapshot of the present position of the motor. As the motor rotates, updated filtered position information is received by the level 1 latch and the previous position information is transferred to a level 2 latch which effectively takes a snapshot of the previous motor position. Up/down control logic is provided to interpret which direction the motor is traveling according to the previous position and the present position signals. The output from the up/down control logic is fed into a position counter register which counts the number of 60° rotation segments undergone by the motor. A twelve bit signal is generated by the position counter register for input into the host CPU which then determines the distance traveled by the motor.

Since the motor is not synchronized with the internal clock of the IC, the outputs generated by the hall sensors cannot be synchronized with the internal detecting pulse utilized by the position monitoring circuit. Accordingly, it is essential to effectively synchronize the IC with the motor hall sensor outputs by programmably adjusting the timing of the internal detecting pulse so as to filter out spurious noise pulses while properly detecting motor rotation pulses. In the motor position monitoring circuit of the present invention, the internal detecting pulse is synchronized with the beginning edge of the signal input as generated by the hall effect sensors thereby minimizing error. A master clock signal is generated external to the motor position monitoring circuit and is prescaled so that one of at least two clock speeds (MCLK/2 or MCLK/8) may be used to tune the resolution of the filters to one of at least two values. This time delay is input into the digital filter section where transient pulses are ignored and valid motor rotation pulses are detected.

The digital filters operate as independent state machines in that with the hall sensor inputs equal to zero, the filters are each at a first state ($S_0$). When any one of the three hall sensor signal inputs transitions to logic one, the corresponding state machine transitions to a second state ($S_1$) where it remains until the delay count is completed. After the delay count, if the hall sensor signal is at a logic zero then the state machine transitions back to the first state ($S_0$). Should the hall sensor signal remain at logic one, the state machine transitions to a third state ($S_2$) and the filter output goes to logic one. The state machine remains in the third state ($S_2$) so long as the hall sensor signal remains at logic one. If the hall sensor signal goes to logic zero then the state machine transitions to a fourth state where it remains until an additional delay count is completed, at which time the filter output goes to logic zero. If at the end of the additional delay count the hall sensor signal is at logic zero, then the state machine transitions back to the first state ($S_0$) and the filter output remains at logic zero. If the hall sensor signal goes to logic one then the state machine transitions back to the third state ($S_2$). This process is repeated throughout motor operation.

In the event the position counter register exceeds the 12 bit limit of 4095, an overflow disable logic block generates a position counter overflow signal. The overflow bit is used to indicate to the host microprocessor that a maximum count has been reached in the 12 bit position counter register. The size of the position counter is intended to encompass all applications and thus the overflow bit is not normally used. In the event that a situation occurs which requires monitoring of additional motor travel, the microprocessor can use this bit to enable one or more extension bits in software. In this manner, the position counter register continues to reflect the correct value of the monitored position even after rolling over due to exceeded capacity.

The data in the position counter is used to indicate motor position in terms of 60 degree rotational increments. Referring to the basic switching sequence table included hereinbelow, with the motor being driven in a forward direction the phase sequencing signal will for instance sequence phase signals A, B and C from a value of 001 to a value of 011 and then from 011 to 010, etc. Each of these phase sequence transitions represents a control signal which sequences motor rotation in 60° segments. Each time the motor rotates through 60°, one and only one of the three hall sensors which are attached to the motor phase windings will change state. This causes the position counter to either increment or decrement the total count based on motor direction. The microprocessor can process this information to calculate average motor speed, motor distance traveled, or, in the previously mentioned automotive application, the steering assist required.

For example, the microprocessor can read the position counter at two different times, at a fixed time interval, and then calculate average motor speed. In an electric steering assist application, the microprocessor can determine how far the cars wheels have turned in relation to the effort the driver places on the steering wheel. In a four wheel steer application, the microprocessor can combine the motor position information from the position counter with the vehicle speed to calculate how much assist is required by the driver. Less assist is required at higher speeds and more assist is required at lower speeds.

Another advantage of the present invention is the operability of the motor position monitoring circuit in a noisy environment, such as found in automotive applications, without the required use of customized external RC low pass filter circuits.

Yet another advantage of the present invention is the increased accuracy in detecting motor position and resulting overall increased system performance.

In one embodiment the invention, in combination with a multi-phase brushless motor having a plurality of motor position sensors attached thereto which generate motor position outputs, provides a motor position monitoring circuit. The motor position monitoring circuit comprises an apparatus for programmably selecting and generating a pre-defined filter time delay constant and an apparatus for receiving and digitally filtering the motor position outputs and generating filtered motor position outputs. A latch receives the filtered motor position outputs and generates first and second latch outputs. Control apparatus receives said first and second latch outputs for determining the direction of motor travel and for generating a directional output indicating the direction of motor travel. A counter

BASIC SWITCHING SEQUENCE TABLE

| Motor Direction Signal | | Phase Sequencing Signal | | | Transistor Gate Drive Signals | | | | | |
|---|---|---|---|---|---|---|---|---|---|---|
| | | | | | High Side | | | Low Side | | |
| FWEN | RVEN | Sa | Sb | Sc | HSa | HSb | HSc | LSa | LAb | LSc |
| 1 | 0 | 0 | 0 | 1 | 0 | 0 | 1 | 0 | 1 | 0 |
| 1 | 0 | 0 | 1 | 1 | 0 | 0 | 1 | 1 | 0 | 0 |
| 1 | 0 | 0 | 1 | 0 | 0 | 1 | 0 | 1 | 0 | 0 |
| 1 | 0 | 1 | 1 | 0 | 0 | 1 | 0 | 0 | 0 | 1 |
| 1 | 0 | 1 | 0 | 0 | 1 | 0 | 0 | 0 | 0 | 1 |
| 1 | 0 | 1 | 0 | 1 | 1 | 0 | 0 | 0 | 1 | 0 |
| 0 | 1 | 1 | 0 | 1 | 0 | 1 | 0 | 1 | 0 | 0 |
| 0 | 1 | 1 | 0 | 0 | 0 | 0 | 1 | 1 | 0 | 0 |
| 0 | 1 | 1 | 1 | 0 | 0 | 0 | 1 | 0 | 1 | 0 |
| 0 | 1 | 0 | 1 | 0 | 1 | 0 | 0 | 0 | 1 | 0 |
| 0 | 1 | 0 | 1 | 1 | 1 | 0 | 0 | 0 | 0 | 1 |
| 0 | 1 | 0 | 0 | 1 | 0 | 1 | 0 | 0 | 0 | 1 |

The digitally filtered hall effect sensor signals indicate the present motor position. These input signals are taken from the level 1 latch and input into the phase commutation logic circuit which generates output drive signals for sequentially switching field effect transistors to their respective conducting and non-conducting states. In this manner, the phase windings of the motor are placed between power and ground using a pulse width modulation (PWM) technique so as to cause the motor to rotate in a desired manner.

One advantage of the present motor position monitoring circuit is the use of digital filters to synchronize the asynchronous motor signals to the internal IC master clock. The position monitoring circuit utilizes a programmable time delay to filter out spurious noise pulses and to detect valid motor rotation signals.

Another advantage of the present invention is the use of a two level latch for storing both previous and present motor positions and a 12 bit position counter to record the distance traveled by a motor.

Yet another advantage of the present invention is the use of the programmable digital filters which permit the motor position monitoring circuit to be utilized in a wide range of motor applications and for various motor loads.

counts successive motor rotational movements and maintains a total count.

The filtering apparatus receives the filter time delay constant and initiates a filter time delay upon detecting a rising edge on the motor position outputs. In this manner, the filtering apparatus filters out shorter duration noise transients, detects longer duration motor rotational movement signals, and generates motor position outputs. The first latch output indicates the present motor position and the second latch output indicates the immediately previous motor position. The counter increments and decrements the total count according to the directional output.

In another embodiment the invention provides a method of monitoring the position of a multi-phase brushless motor having a plurality of motor position sensors attached thereto which generate motor position output signals. The method of monitoring motor position comprises the following steps. Step 1; monitoring the output signals of the motor position sensors and, upon observing a rising edge on the output of any one motor position sensor, initiating a time delay. Step 2; at the end of the time delay initiated in Step 1, (1) returning to Step 1 if the motor position sensor underwent no actual change in condition, or (2) updating a motor position latch should the motor position sensor exhibit an actual change in condition. Step 3; monitoring the present and immediately previous motor positions for any changes therein and determining the direction in which the motor is traveling. Step 4; counting the number of successive rotational segments traveled by the motor and incrementing or decrementing the count total based upon the direction in which the motor is traveling.

BRIEF DESCRIPTION OF THE DRAWINGS

The above-mentioned and other features and objects of this invention, and the manner of attaining them, will become more apparent and the invention itself will be better understood by reference to the following description of embodiments of the invention taken in conjunction with the accompanying drawings, wherein:

FIG. 1 is a system block diagram of a prior art motor control circuit compatible with the present invention;

FIG. 2 is a schematic diagram of prior art commutation logic associated with the motor control circuit of FIG. 1;

FIG. 3 is a block diagram illustrating the motor position monitoring circuit of the present invention;

FIG. 8A is a schematic diagram of the up/down counter associated with the motor position monitoring circuit of FIG. 6;

FIG. 8B is a hybrid logic diagram of one bit of the up/down position counter of FIG. 8A; and FIG. 9 is a schematic diagram of the clock prescaler used to generate the filter clock signal for use in the motor position monitoring circuit of FIG. 6.

Figure 4:
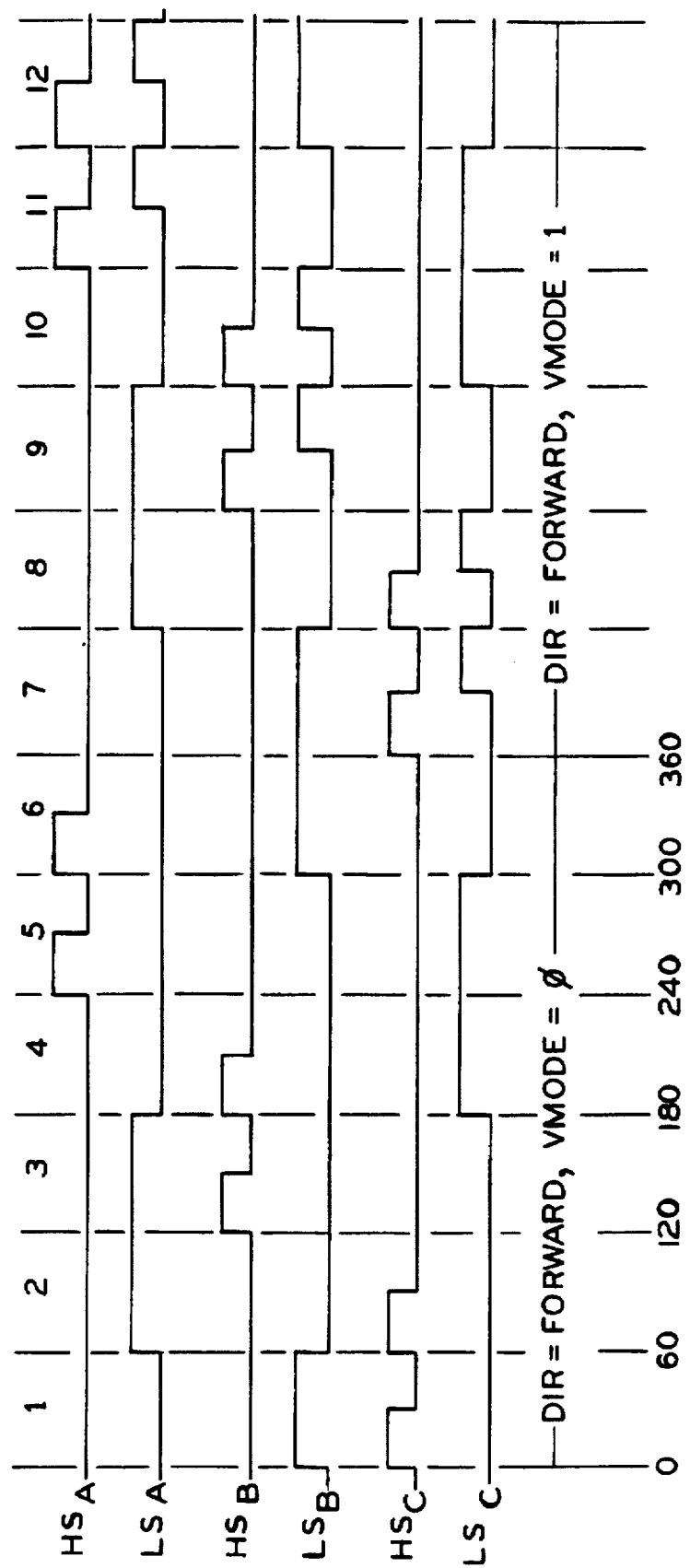
FIG. 4 is a hall sensor input signal and output driver circuit timing chart associated with the motor position monitoring circuit of FIG. 3 illustrating a 50% duty cycle PWM mode of operation.

Corresponding reference characters indicate corresponding parts throughout the several views. The exemplification set out herein illustrates a preferred embodiment of the invention, in one form thereof, and such exemplifications are not to be construed as limiting the scope of the invention in any manner.

DETAILED DESCRIPTION OF THE INVENTION

FIG. 1 illustrates a prior art motor control circuit 20 which sequentially drives phase windings A, B and C of three phase motor 22. Power supply 24 provides operating voltages for the various components of motor control circuit 20, which include control block 26, commutation logic block 28 and output block 30. Control block 26 receives user input signals which indicate the rotational movement of motor 22. The output of control block 26 is input into commutation logic block 28 along with the output of shaft position sensor assembly 32 which, according to the basic sequencing table included hereinabove, determines the desired phase sequencing necessary to effectuate the desired motor rotation. This information is input to output stage 30, which commonly operates in conjunction with a field effect transistor network, whereby motor windings A, B, and C are sequentially placed between power and ground using standard pulse width modulation (PWM) techniques so as to cause motor 22 to rotate in a desired fashion.

FIG. 2 illustrates prior art commutation logic associated with the motor control circuit 20 of FIG. 1. Shaft position sensors Sa, Sb and Sc are input from shaft position sensor assembly 32 into commutation logic block 28, along with forward and reverse signals 34 and 36 as generated by control block 26. Outputs Q1 through Q6 are generated to sequentially cause motor 22 to rotate in a desired manner. This method of controlling a brushless motor is further described in U.S. Pat. No. 5,574,346, issued Nov. 12, 1996, 1995 entitled "On and Off State Fault Detection Circuit for a Multiphased Brushed or Brushless DC Motor" as assigned to the present assignee and which is included herein by reference.

Figure 5:
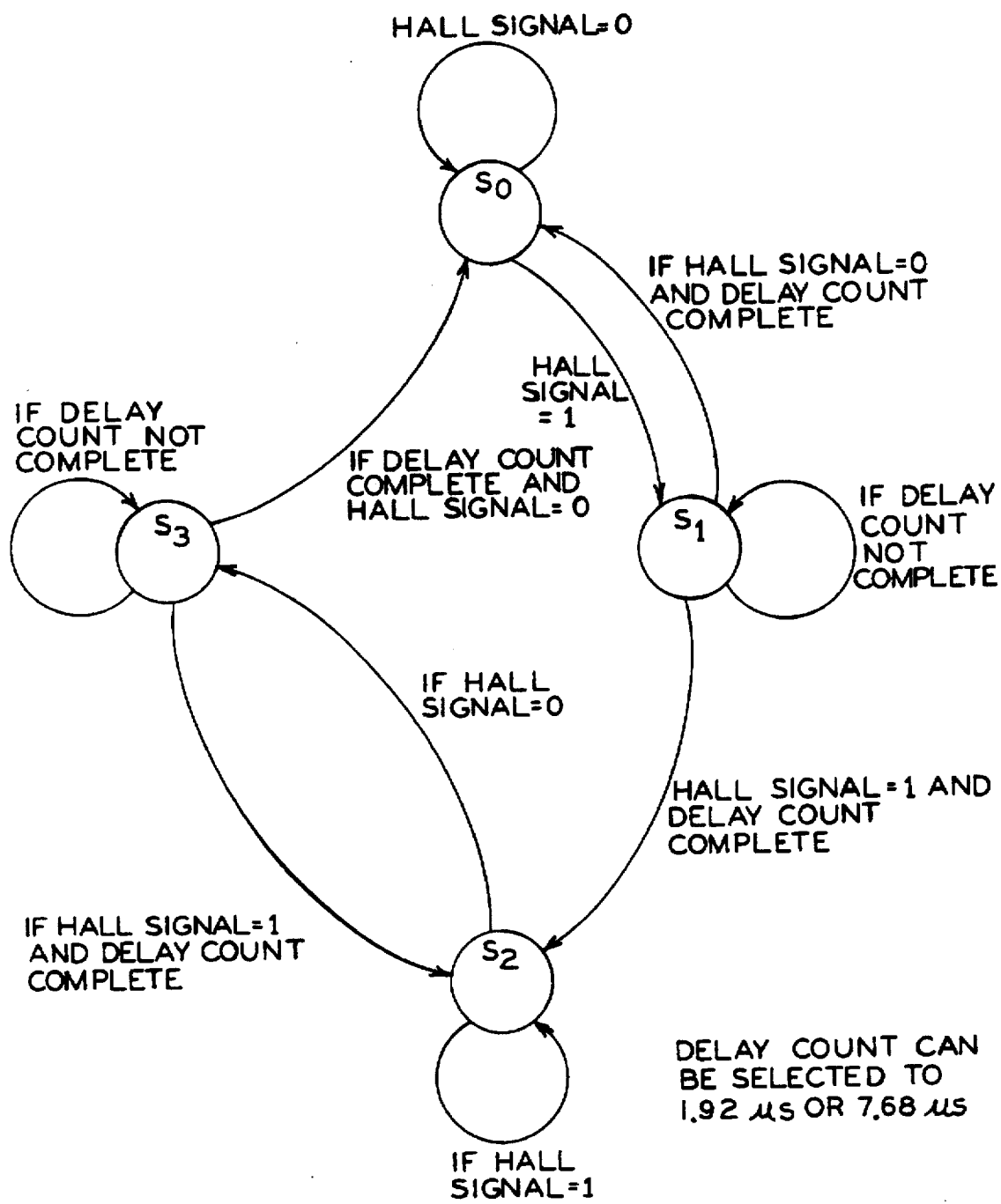
FIG. 5 is a state chart illustrating the state machine of the hall sensor input digital filters as used in the motor position monitoring circuit of FIG. 3.

FIG. 3 illustrates the motor position monitoring circuit of the present invention 37 as having digital filter section 38, level 1 and level 2 latch sections 44, 46, a position counter 52 and up/down control section 50. Hall effect sensor inputs Sa, Sb and Sc, which are external to the IC, are input into digital filter section 38, which also receives programmable digital filter time constant 40. The operation of digital filter section 38 is described in detail hereinbelow and is illustrated in FIG. 5. In general, digital filter section 38 filters out spurious noise pulses and detects valid motor rotation hall effect sensor inputs and generates filtered position sensor signals which are input into level 1 latch 44. Level 1 latch 44 effectively takes a snapshot of the present position of the motor being controlled.

As the motor rotates, each time a motor event occurs the information stored in level 1 latch 44 is transferred to level 2 latch 46, which effectively takes a snapshot of the immediately previous motor position. New motor position information is simultaneously received within level 1 latch 44 indicating the then present motor position. By definition, a motor event occurs each time the motor travels a predefined segment of rotation, such as 60°.

Motor position monitoring circuit 37 is shown operatively connected to brushless motor driver circuit 39 which includes: clocks and control block 42, phase commutation logic block 48, and serial peripheral interface 86. A brushless motor driver circuit such as that indicated by reference numeral 39 is described in aforesaid U.S. Pat. No. 5,574, 346. Clocks and control block 42 generates filter time constant 40 which is input into digital filter section 38. The present motor position information, registered in level 1 latch 44, is input into phase commutation logic block 48. Commutation logic block 48 receives user input forward and reverse direction information and generates an output string of digital information. In the case of a three phase motor, a six bit string is generated to sequentially drive the three motor phases so as to cause the motor to rotate in a desired manner. The present and previous motor position information is input into up/down control block 50. Up/down control block 50 monitors the present and previous position signals and generates an output indicating whether position counter 52 should increment or decrement the total count value by 1.

The 12 bit output 92 of position counter 52 is available for use by microprocessor 90. The data in position counter 52 indicates motor position in terms of 60° increments or decrements. As described in aforesaid U.S. Pat. No. 5,574, 346, and in accordance with the basic switching sequence table included hereinabove, motor control circuit 39 sequentially drives the motor in 60° rotational segments. For example with the motor being driven in the forward direction, the phase switching sequence transitions from 001 to 011. This represents the sequencing data for phases A, B and C as the motor is driven 60° in the forward direction. Each time the motor rotates through 60°, one of the three hall effect sensors attached to phase windings A, B and C will switch states, logic zero to logic one or vice versa. The changing state of the hall effect sensor causes the position counter to either increment or decrement the total count based upon the direction of motor rotation.

FIG. 4 represents a timing chart for the 50% duty cycle PWM mode of operation corresponding to the pulse width modulation drive sequence shown in the table below and associated with the motor position monitoring circuit of FIG. 3. In the table, "P" equals the pulse width modulation for a given duty cycle value (e.g. 50%) and "p" equals the pulse width modulation for the remainder of the given duty cycle.

signal goes to logic zero then the state machine transitions to a fourth state where it remains until an additional delay count is completed, at which time the filter output goes to logic zero. If at the end of the additional delay count the hall sensor signal is logic zero, then the state machine transitions back to the first state ($S_0$) and the filter output remains at logic zero. If the hall sensor signal goes to logic one then the state machine transitions back to the third state ($S_2$). This process is repeated throughout motor operation.

Figure 6:
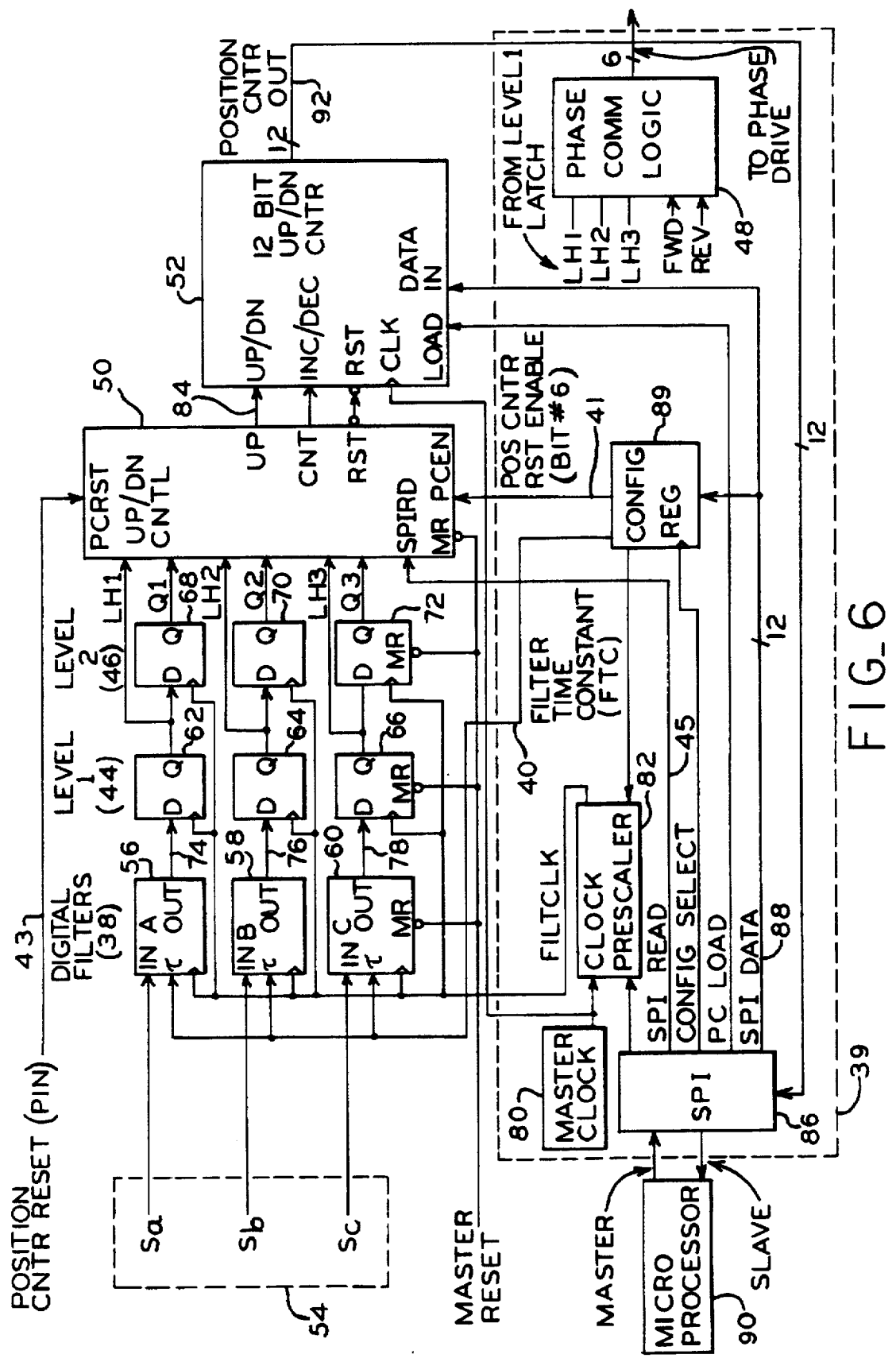
FIG. 6 is a schematic diagram of the motor position monitoring circuit of FIG. 3.

FIG. 6 illustrates motor position monitoring circuit 37 of FIG. 3 in more detail. Hall effect sensors, which are external from the IC and attached to a motor, generate motor position outputs 54, designated as Sa, Sb and Sc. Motor position outputs 54 are input into digital filter A 56, digital filter B 58 and digital filter C 60 respectively. Each time the phase commutation logic block 48, as shown in FIG. 4, commutates the motor wingings to a next position, one and only one hall effect sensor will toggle its output signal to the opposite state, i.e. from logic zero to logic one or vice versa. The digital filter processes the hall effect sensor signal in accordance with the description relating to FIG. 5. Via micropro-

PHASE MODULATION DRIVE SEQUENCE TABLE

| Motor Direction Signal | | Phase Sequencing Signal | | | Transistor Gate Drive Signals | | | | | |
|---|---|---|---|---|---|---|---|---|---|---|
| | | | | | High Side | | | Low Side | | |
| FWEN | RVEN | Sa | Sb | Sc | HSa | HSb | HSc | LSa | LAb | LSc |
| F | 0 | 0 | 0 | 1 | 0 | 0 | p-1/0 | 0 | 1 | 0 |
| F | 0 | 0 | 1 | 1 | 0 | 0 | p-1/0 | 1 | 0 | 0 |
| F | 0 | 0 | 1 | 0 | 0 | p-1/0 | 0 | 1 | 0 | 0 |
| F | 0 | 1 | 1 | 0 | 0 | p-1/0 | 0 | 0 | 0 | 1 |
| F | 0 | 1 | 0 | 0 | p-1/0 | 0 | 0 | 0 | 0 | 1 |
| F | 0 | 1 | 0 | 0 | p-1/0 | 0 | 0 | 0 | 0 | 1 |
| F | 0 | 1 | 0 | 1 | p-1/0 | 0 | 0 | 0 | 1 | 0 |
| F | 1 | 0 | 0 | 1 | 0 | 0 | p-1/0 | 0 | 0 | p-0/1 |
| F | 1 | 0 | 1 | 1 | 0 | 0 | p-1/0 | 1 | 0 | p-0/1 |
| F | 1 | 0 | 1 | 0 | 0 | p-1/0 | 0 | 1 | p-0/1 | 0 |
| F | 1 | 1 | 1 | 0 | 0 | p-1/0 | 0 | 0 | p-0/1 | 1 |
| F | 1 | 1 | 0 | 0 | p-1/0 | 0 | 0 | p-0/1 | 0 | 1 |
| F | 1 | 1 | 0 | 1 | p-1/0 | 0 | 0 | p-0/1 | 1 | 0 |
| R | 0 | 1 | 0 | 1 | 0 | p-1/0 | 0 | 1 | 0 | 0 |
| R | 0 | 1 | 0 | 0 | 0 | 0 | p-1/0 | 1 | 0 | 0 |
| R | 0 | 1 | 1 | 0 | 0 | 0 | p-1/0 | 0 | 1 | 0 |
| R | 0 | 0 | 1 | 0 | p-1/0 | 0 | 0 | 0 | 1 | 0 |
| R | 0 | 0 | 1 | 1 | p-1/0 | 0 | 0 | 0 | 0 | 1 |
| R | 0 | 0 | 0 | 1 | 0 | p-1/0 | 0 | 0 | 0 | 1 |
| R | 1 | 0 | 0 | 1 | 0 | p-1/0 | 0 | 1 | p-0/1 | 0 |
| R | 1 | 0 | 1 | 1 | 0 | 0 | p-1/0 | 1 | 0 | p-0/1 |
| R | 1 | 0 | 1 | 0 | 0 | 0 | p-1/0 | 0 | 0 | p-0/1 |
| R | 1 | 1 | 1 | 0 | p-1/0 | 0 | 0 | p-0/1 | 1 | 0 |
| R | 1 | 1 | 0 | 0 | p-1/0 | 0 | 0 | p-0/1 | 0 | 1 |
| R | 1 | 1 | 0 | 1 | 0 | p-1/0 | 0 | 0 | p-0/1 | 1 |

FIG. 5 is a state chart illustrating the state machine operation of digital filter section 38. The digital filters operate as independent state machines in that with the hall sensor inputs equal to zero, the filters are each at a first state ($S_0$). When any one of the three hall sensor signal inputs transitions to logic one, the corresponding state machine transitions to a second state ($S_1$) where it remains until the delay count is completed. After the delay count, if the hall sensor signal is at a logic zero then the state machine transitions back to the first state ($S_0$). Should the hall sensor signal remain at logic one, the state machine transitions to a third state ($S_2$) and the filter output goes to logic one. The state machine remains in the third state ($S_2$) so long as the hall sensor signal remains at logic one. If the hall sensor cessor 90, a scaled clock signal is selected (via FTC) in accordance with the particular motor application. Filter time constant 40 provides the time delay needed to filter out spurious noise pulses and to detect valid hall effect sensor pulses.

For example, with master clock 80 operating at 16 megahertz in a 1 bit design, filter time delay constant 40 may be programmed to one of two values, 1.92 microseconds with the bit at a logic zero and 7.68 microseconds with the bit at a logic one. In this scenario, if the pulse width is greater than 1.92 microseconds then it is a valid pulse and if the pulse is less than 0.96 microseconds it will be filtered out as noise. Due to the asynchronous relationship between the motor and the IC, a problem arises when the pulse width is between 0.96 microseconds and 1.92 microseconds.

The present invention alleviates this problem by initiating an internal detecting pulse upon encountering a rising edge in the hall sensor signal input. In our example, a digital filter will detect the rising edge in the affected hall sensor signal input and initiate an internal detecting pulse. 1.92 microseconds later, a second internal detecting pulse is generated. If the hall sensor signal pulse width is greater than 1.92 microseconds, then the hall sensor signal will be found to be a valid pulse and the digital filter increments or decrements the phase sequencing signal accordingly. If the hall sensor signal pulse width is less than 1.92 microseconds, then the rising edge on the hall sensor signal will be interpreted as spurious noise and will be disregarded. This implementation overcomes the sampling errors associated with standard digital filters of the same type.

Filtered position signals 74, 76, 78 are output from digital filters 56, 58 and 60 and are input into level 1 latches 62, 64 and 66 respectively. When a motor event occurs, latches 62, 64, 66 effectively take a snapshot of the present position of the motor. When a subsequent motor event occurs, these values are then passed along to level 2 latches 68, 70 and 72. Latches 68, 70 and 72 effectively take a snapshot of the previous motor position, and new information is input from digital filters 56, 58 and 60 into level 1 latches 62, 64 and 66. This sequential transfer of motor position information is continuous during motor operation.

Present position signals LH1, LH2, LH3 are input into up/down control block 50 and phase commutation logic block 48, as shown in FIG. 4, where they are used in developing the proper output drive signals. The information generated by level 1 latches 62, 64, 66 and level 2 latches 68, 70, 72 is received by up/down control block 50 which generates an output 84 which indicates whether position counter 86 should increment or decrement the running count total.

Up/down counter 52 receives 12 bit SPIDATA data string 88 from serial peripheral interface 88 and tracks the relative position of the motor under control. 12 bit SPIDATA data string 88 is generated by a shift register in motor control circuit 39 which is written by host microprocessor 90 via serial peripheral interface 86. Through SPIDATA data string 88, microprocessor 90 may initialize up/down counter 52 at a value other than the default value, which is all zeros (0×000H). Microprocessor 90 may at any time write over these bits and reinitialize up/down counter 52, such as in the case of a diagnosed stuck condition or during system malfunction recovery. This must be done with great care. 12 bit data output string 92, output from up/down counter 52, provides motor position information and is input into microprocessor 90. As the motor is caused to rotate in a particular direction, up/down control block 50 causes up/down counter 52 to increment or decrement the value of 12 bit data string 92.

In the particular arrangement as described above, up/down counter 52 increments or decrements the running count total each time a 60° rotation of the motor is observed. For example, the total count may be incremented each time the motor rotates forward 60° and may decrement each time the motor rotates backwards 60°. FIG. 8A illustrates one embodiment of up/down counter 52 in which 12 one bit counters 53 are utilized to generate the 12 bit data string which represents the running count total. In addition, the 12 one bit counters are utilized to generate overflow signal OVF which may be transferred to microprocessor 90 to indicate that up/down counter 52 has reached its count limit. When such a count rollover occurs, microprocessor 90 can reset up/down counter 52 and provide additional memory for effectively extending the count capacity of the circuit.

A shift register written by microprocessor 90 via serial peripheral interface 86 resets the 12 bit SPIDATA data string 88. Data string 88 may be connected to several registers, one in particular is configuration register 89. When microprocessor 90 performs a serial access, it also selects, via bits in the serial input stream, which register to write to, such as configuration register 89. Register 89 contains several bits that "configure" the operation of brushless motor drive circuit 39. One bit, filter time constant 40, selects which of at least two filter time constant values will be used in the digital filters 56, 58, 60, effectively selecting from coarse to fine filtration. A second bit, position counter reset enable bit 41, is used to enable resetting of the position counter via software control.

Figure 7:
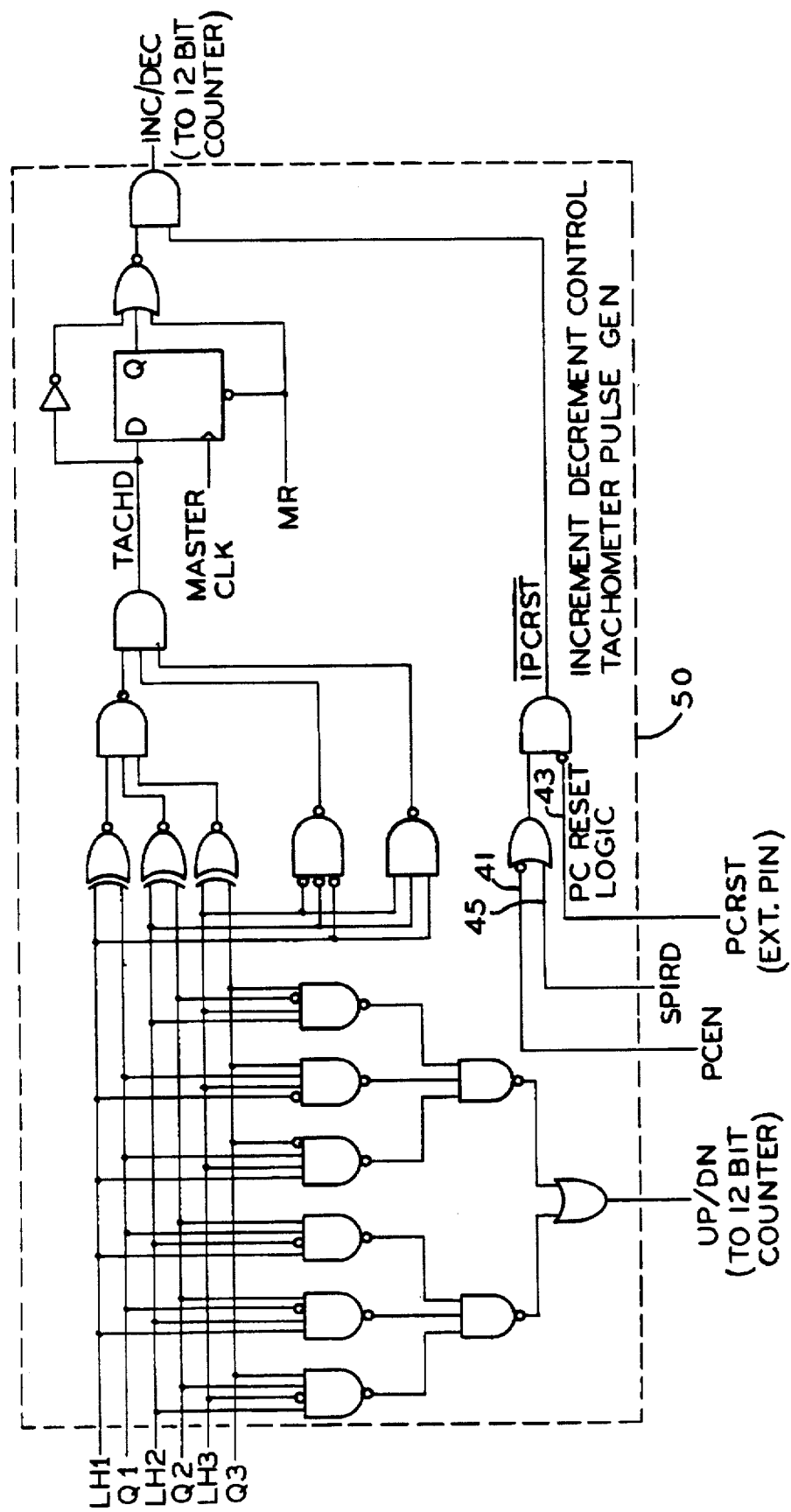
FIG. 7 is a schematic diagram of the logic implementation of the up/down control block for generating an increment/decrement signal associated with the motor position monitoring circuit of FIG. 6.

Position counter 52 may be reset in two different manners; 1) by toggling the position counter reset input pin 43 high and then low, and 2) by setting position counter reset enable bit 41 and configuration register 89 and then performing a serial peripheral interface read on brushless motor drive circuit 39. Each time an SPI read is performed and position counter reset enable pin 41 is set, a reset of position counter 52 is accomplished. One embodiment of the logic associated with the above-described operation is shown in FIG. 7. Referring to FIG. 7, SPIRD input 45 is a signal coming from serial peripheral interface 86 which pulses high immediately after each SPI reading.

FIG. 8B illustrates the logic associated with one bit of up/down position counter 52 of FIG. 8A. Single bit counter 53 includes toggle flip-flop 55 which is synthesized using a D flip-flop. One bit of SPIDATA 88 is loaded in up/down counter block 53 via the DP input. Up/down counter block 53 operates using synchronous principles, hence the synchronous reset input to 2-input AND gate 57. Logic gates 59 generate a "carry out" signal Cout based on whether up/down counter 53 is counting in the up or down direction. The counter overflow signal is generated by simple pulse extender circuit 65 which consists of AND GATE 61 and D flip-flop 63 as shown in FIG. 8A. Carry out signals Cout are too short in duration for proper processing and therefor requires the use of pulse extender 65.

Microprocessor 90 can use motor position information 92 to calculate average motor speed, motor distance traveled, or steering assist required. For example, microprocessor 90 can read 12 bit motor position data string 92 twice during a fixed time interval, and thereby calculate average motor speed. In an electric steering assist application, microprocessor 90 can determine how far a car's wheels have turned in relation to the effort the driver places on the steering wheel. In a four wheel steer application, microprocessor 90 can combine 12 bit data string 92 from up/down counter 52 with the vehicle speed in order to calculate how much assist is required by the driver. Less assist is required at higher speeds and more assist is required at lower speeds.

Overflow block 94 provides overflow protection such that in the event the number of rotation segments exceeds the capacity of the 12 bit data string, overflow signal 96 is generated and input into microprocessor 90. Overflow bit 96 indicates to microprocessor 90 that a maximum count has been reached in 12 bit position counter register 86. The size of position counter register 86 is intended to encompass all applications and thus the overflow bit is not normally used. In the event, however, that an application surfaces which requires more motor travel to be monitored, overflow bit 96 can be used by microprocessor 90 to enable one or more extension bits. A counter may be maintained in microprocessor software that allows a counter which rolls over to continue to produce the correct value of the monitored motor position.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. In combination with a multi-phase brushless motor having a plurality of motor position sensors attached thereto which generate motor position outputs, a method of monitoring motor position, comprising the steps of:

(a) programmably selecting and generating a pre-defined filter time delay constant;

(b) receiving and digitally filtering the motor position outputs with a digital filter which utilizes said filter time delay constant generated in step (a) to initiate a filter time delay upon detecting a rising edge on the motor position outputs, whereby noise transients having a shorter duration than said filter time delay constant are filtered out, and motor rotational movement signals having a longer duration than said filter time delay constant are allowed to pass through the digital filter resulting in filtered motor position outputs;

(c) receiving said filtered motor position outputs generated in step (b) into a digital latch and generating first and second latch outputs, wherein said first latch output indicates a present motor position and said second latch output indicates a motor position immediately previous to said present motor position;

(d) receiving said first and second latch outputs generated in step (c) into a directional controller which determines motor rotation direction and generates a directional output indicating the motor rotation direction; and (e) monitoring the information generated in steps (b), (c) and (d) and counting with a counting device successive motor rotational movements to generate a total count, said total count being incremented and decremented according to said directional output.

2. The method of monitoring motor position of claim 1, wherein said digital latch comprises a first and a second latch, said first latch receiving said filtered motor position outputs and generating said first latch output, said second latch receiving said first latch output and generating said second latch output.

3. The method of monitoring motor position of claim 1 further comprising the steps of interfacing said directional controller with a host microprocessor, whereby said filter time delay constant is programmably defined by said host microprocessor and said total count is resetable by said host microprocessor.

4. The method of monitoring motor position of claim 3, wherein said filter time delay constant is capable of being programmably defined as any one of two values.

5. The method of monitoring motor position of claim 4, wherein said filter time delay constant values are in the range of 1.92 microseconds to 7.68 microseconds.

6. The method of monitoring motor position of claim 3, wherein said filter time delay constant is capable of being programmably defined as any one of four values.

7. The method of monitoring motor position of claim 6, wherein said filter time delay constant values are in the range of 1.92 microseconds to 7.68 microseconds.

8. The method of monitoring motor position of claim 1 further comprising the steps of generating an output indicating whether said total count exceeds the capacity of said counting device.

9. In an electronic motor control circuit for driving a brushless multi-phase electric motor having a plurality of phase windings and a plurality of motor position sensors attached thereto which generate motor position outputs, the motor control circuit comprising a serial peripheral interface for interfacing with a host microprocessor, and phase commutation logic, a motor position monitoring circuit, comprising:

means for generating a pre-defined filter time delay constant, said generating means being programmable by said host microprocessor via said serial peripheral interface;

means for receiving and digitally filtering said motor position outputs, said filtering means receiving said filter time delay constant and initiating a filter time delay upon detecting a rising edge on the motor position outputs, whereby said filtering means filters out shorter duration noise transients and detects longer duration motor rotational movement signals, said filtering means generating filtered motor position outputs;

a latch for receiving said filtered motor position outputs and generating first and second latch outputs, said first latch output indicating a present position of the motor, said second latch output indicating a motor position immediately previous to said present position of the motor, said phase commutation logic receiving said first latch output and generating phase driver outputs for sequentially driving the windings of the motor in a desired manner;

control means for receiving said first and second latch outputs and for generating a directional output indicating motor direction of rotation; and means for counting successive rotational movements of the motor and maintaining a total count, said counting means incrementing and decrementing said total count according to said directional output, said total count being accessible by said host microprocessor via said serial peripheral interface.

10. The motor position monitoring circuit of claim 9, wherein said latch comprises a first and a second latch, said first latch receiving said filtered motor position outputs and generating said first latch output, said second latch receiving said first latch output and generating said second latch output.

11. The motor position monitoring circuit of claim 9, wherein said filter time delay constant is capable of being programmably defined as any one of two values.

12. The motor position monitoring circuit of claim 11, wherein said filter time delay constant values are in the range of 1.92 microseconds to 7.68 microseconds.

13. The motor position monitoring circuit of claim 9, wherein said filter time delay constant is capable of being programmably defined as any one of four values.

14. The motor position monitoring circuit of claim 13, wherein said filter time delay constant values are in the range of 1.92 microseconds to 7.68 microseconds.

15. The motor position monitoring circuit of claim 9 wherein said counting means includes means for generating an overflow output indicating whether said total count exceeds the capacity of said counting means, and means for providing said overflow output to said host microprocessor.

16. The method of monitoring the position of a multiphase brushless motor, comprising the steps of:

(a) monitoring output signals of digital motor position sensors and, upon observing a change in of any one of said output signals from a first state to a second state, initiating a time delay;

(b) at the end of said time delay, (1) returning to step (a) if such output signal returned to said first state, or (2) updating a motor position latch if such output signal remained at said second state;

(c) monitoring successive updating of aid motor position latch to determine motor direction of rotation; and (d) counting the number of updates of said motor position latch with a counting device and incrementing or decrementing a count total of said counting device based upon said motor direction of rotation.

17. The method of monitoring the position of a multiphase brushless motor of claim 16 further comprising the step of:

(e) interfacing the counting device with a host microprocessor which receives and processes the count total to determine a distance traveled by the motor and which is capable of resetting the count total.

18. The method of monitoring the position of a multiphase brushless motor of claim 17 further comprising the step of:

(f) monitoring for an overflow condition in which the count total exceeds the capacity of the counting device and in the event an overflow condition exists, generating an overflow output for processing by the host microprocessor.

\* \* \* \* \*